(12) United States Patent
Green et al.

(10) Patent No.: US 9,879,701 B2
(45) Date of Patent: Jan. 30, 2018

(54) ACTUATOR

(71) Applicant: SAFRAN LANDING SYSTEMS UK LTD, Bloucester, Bloucestershire (GB)

(72) Inventors: Christopher Green, Churchdown (GB); Robert Kyle Schmidt, Cheltenham (GB); David Smart, Cheltenham (GB)

(73) Assignee: Safran Landing Systems UK LTD, Gloucestershire (GB)

( * ) Notice: Subject to any disclaimer, the term of this patent is extended or adjusted under 35 U.S.C. 154(b) by 52 days.

(21) Appl. No.: 14/786,699

(22) PCT Filed: Apr. 24, 2014

(86) PCT No.: PCT/GB2014/051282
§ 371 (c)(1),
(2) Date: Oct. 23, 2015

(87) PCT Pub. No.: WO2014/174302
PCT Pub. Date: Oct. 30, 2014

(65) Prior Publication Data
US 2016/0076561 A1    Mar. 17, 2016

(30) Foreign Application Priority Data
Apr. 25, 2013   (GB) .................................. 1307498.4

(51) Int. Cl.
*F15B 15/14*   (2006.01)
*F16F 9/06*    (2006.01)
(Continued)

(52) U.S. Cl.
CPC .......... *F15B 15/1457* (2013.01); *B64C 25/60* (2013.01); *F15B 11/123* (2013.01);
(Continued)

(58) Field of Classification Search
CPC ............... F15B 11/123; F15B 15/1409; F15B 15/1438; F15B 15/1457; F16F 9/063;
(Continued)

(56) References Cited

U.S. PATENT DOCUMENTS 2,423,736 A   7/1947  Tack
2,608,404 A   8/1952  Gruss
(Continued)

FOREIGN PATENT DOCUMENTS

EP   1076190   2/2001
EP   1191251   3/2002
(Continued)

OTHER PUBLICATIONS

Great Britain Search Report for Great Britain Application No. GB1307498.4 dated Oct. 15, 2013.
(Continued)

*Primary Examiner* — Logan Kraft
(74) *Attorney, Agent, or Firm* — RatnerPrestia

(57) ABSTRACT

An actuator arranged to be movable between an extended condition and a compressed condition and being biased to an intermediate condition between and distinct from the extended condition and the compressed condition. The actuator includes a damping device arranged to define the damping coefficient of the actuator. The damping device is arranged to provide a relatively low damping coefficient when the actuator is in a first condition distinct from the intermediate condition, and a relatively high damping coefficient when the actuator is in a second condition, the second condition being distinct from the first condition and being equal or adjacent to the intermediate condition

21 Claims, 8 Drawing Sheets

(51) Int. Cl.
*B64C 25/60* (2006.01)
*F16F 9/48* (2006.01)
*F15B 11/12* (2006.01)

(52) U.S. Cl.
CPC ...... *F15B 15/1409* (2013.01); *F15B 15/1438* (2013.01); *F16F 9/063* (2013.01); *F16F 9/486* (2013.01)

(58) Field of Classification Search
CPC .. F16F 9/18; F16F 9/486; B64C 25/60; B64F 2700/6242
See application file for complete search history.

(56) References Cited

U.S. PATENT DOCUMENTS

| 2,916,283 | A | 12/1959 | Westcott | |
| 4,552,324 | A | 11/1985 | Hrusch | |
| 6,308,916 | B1 * | 10/2001 | Hrusch | B64C 25/22 244/102 R |
| 9,481,452 | B2 * | 11/2016 | Lindahl | B64C 25/22 |

FOREIGN PATENT DOCUMENTS

| EP | 2530355 | 12/2012 |
| GB | 2011018 | 7/1979 |
| GB | 2170294 | 7/1986 |

OTHER PUBLICATIONS

International Preliminary Report on Patentability for International Application No. PCT/GB2014/051282 dated Dec. 23, 2014.
International Search Report for International Application No. PCT/GB2014/051282 dated Aug. 28, 2014.

* cited by examiner

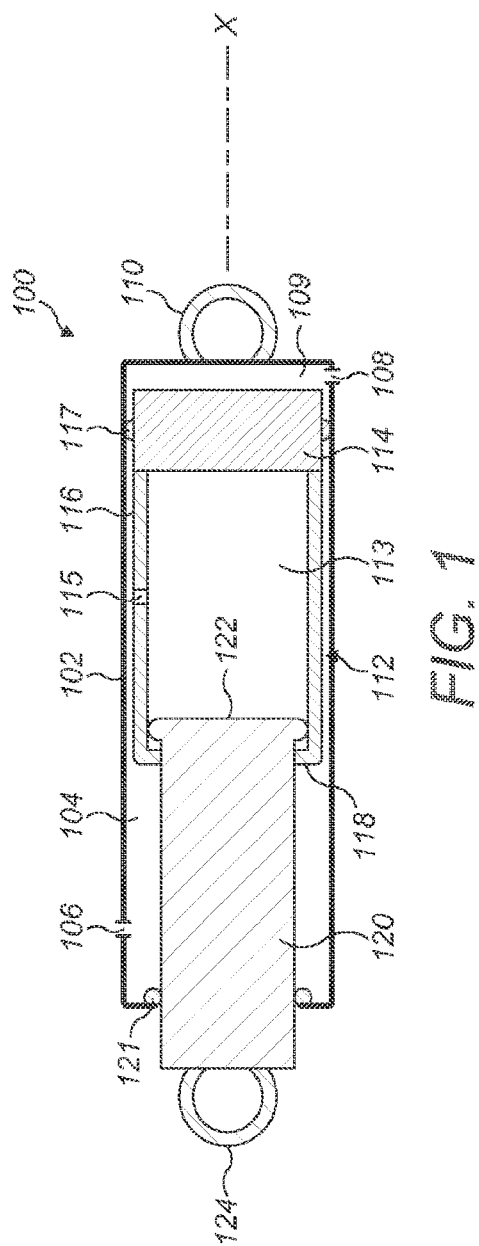

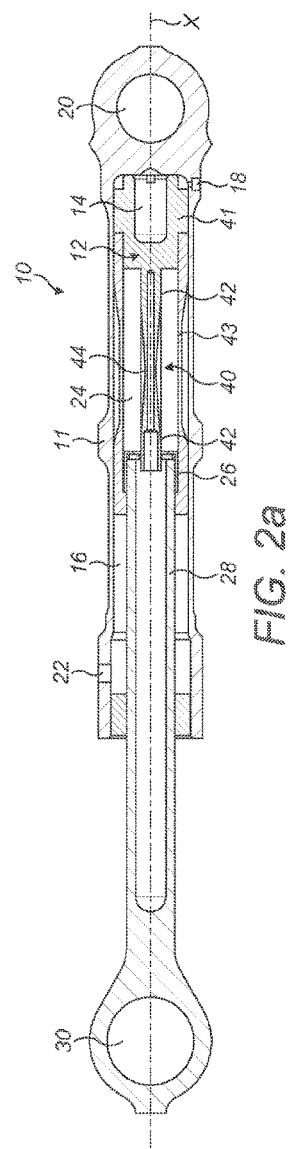
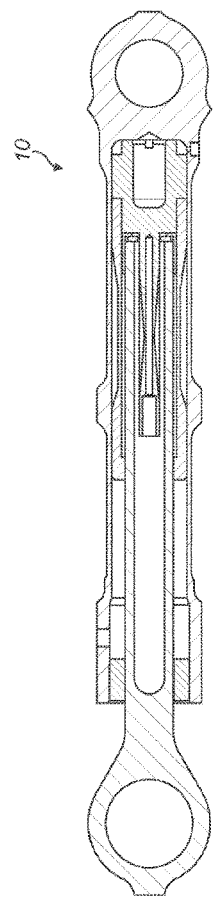
FIG. 2a
FIG. 2b

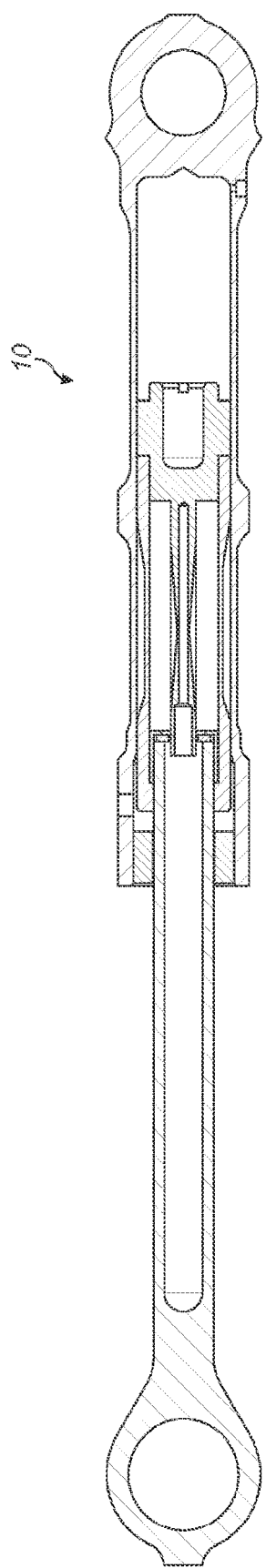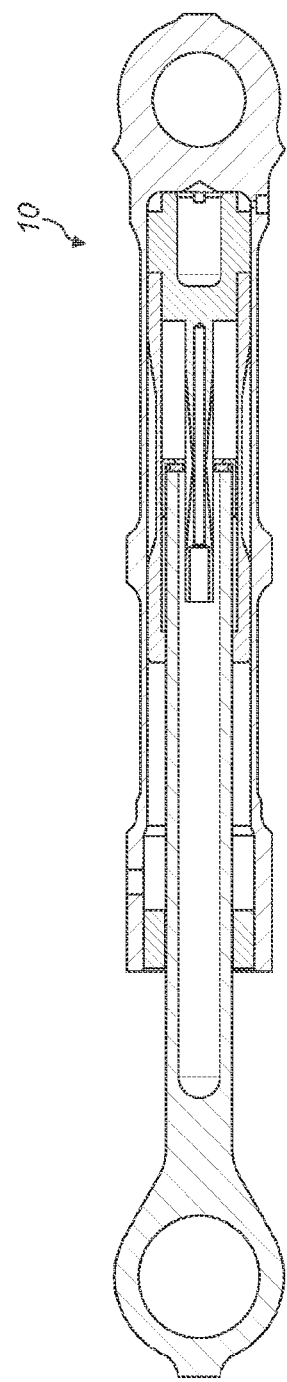

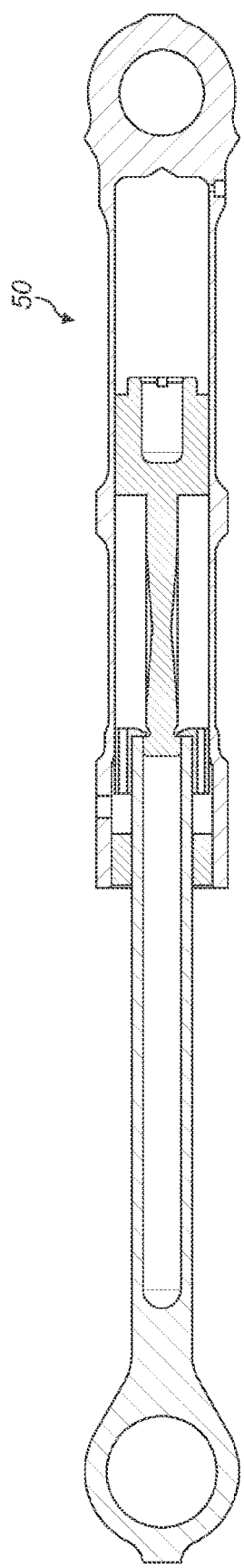
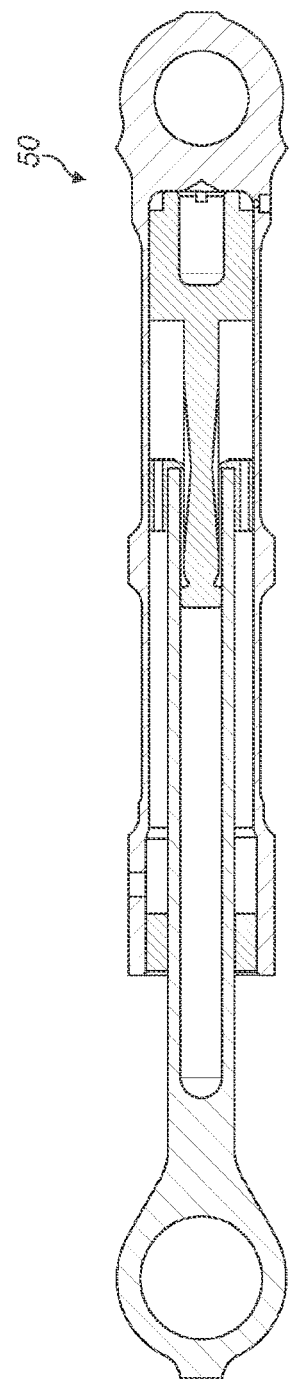
FIG. 3c
FIG. 3d

ACTUATOR

This application is a U.S. National Phase application of PCT International Application No. PCT/GB2014/051282, filed Apr. 24, 2014, which claims the benefit of GB 1307498.4, filed Apr. 25, 2013, both of which are incorporated by reference herein.

BACKGROUND

A known class of actuator is arranged so as to be biased to assume an intermediate condition which lies between a compressed condition and an extended condition in terms of the extension state of the actuator. Such actuators will be referred to herein as "centre seeking". When operated, a centre seeking actuator will oppose an applied force which acts to move the actuator from the intermediate condition.

As such, a centre seeking actuator may be used to bias a first part of an assembly to move to a predetermined position relative to a second part of the assembly and oppose relative movement from the predetermined position.

The present inventors have identified that known centre seeking actuators can be improved in terms of enduring the various operational states of an assembly.

SUMMARY

According to a first aspect of the invention, there is provided an actuator arranged to be movable between an extended condition and a compressed condition and being biased to an intermediate condition between and distinct from the extended condition and the compressed condition, the actuator including a damping device arranged to define the damping coefficient of the actuator, the damping device being arranged to provide a relatively low damping coefficient when the actuator is in a first condition distinct from the intermediate condition, and a relatively high damping coefficient when the actuator is in a second condition, the second condition being distinct from the first condition and being equal or adjacent to the intermediate condition.

Thus, the actuator according to the first aspect has a relatively low damping coefficient when in the first condition, which may in embodiments of the invention equate to an operational state in which the actuator experiences forced extension and contraction; for example, a ground manoeuvring state for an aircraft landing gear pitch trimmer. As such, the actuator provides relatively low resistance to changes in its length, which may provide for increased operational lifespan of the actuator and/or parts to which it is coupled. The actuator is biased to an intermediate condition; for example, a stowing orientation for a landing gear bogie beam. The damping device is arranged to provide a relatively high damping coefficient at a second condition at or adjacent to the intermediate condition. As such, in embodiments of the invention the relatively high damping coefficient at a second condition assists in the actuator achieving a stable intermediate condition with less oscillations and therefore less load cycles in comparison to known actuators. The second condition being equal to or adjacent to the intermediate condition results in the actuator assuming the second condition one or more times as the shock absorber moves towards the settled state in the intermediate condition.

In some embodiments "equal or adjacent to" may comprise the second condition being closer to the intermediate condition than to the extended condition or the compressed condition.

In embodiments of the invention the intermediate condition may be anywhere between but distinct from the extended and compressed conditions. In some embodiments the intermediate condition may be generally mid way between the extended and compressed conditions.

The damping device may be arranged to increase and/or decrease the damping coefficient by at least a factor of two and preferably at least by a factor of three.

The damping device may be arranged to provide a plurality of second conditions. Thus, the actuator may include a damping or 'snubbing' region having a plurality of distinct second conditions.

The damping device may be arranged to linearly or non-linearly vary the damping coefficient.

In some embodiments the damping device is arranged to vary the damping coefficient in accordance with the extension state of the actuator.

The damping device may be a passive device or an active device. The actuator may be biased towards the intermediate condition from both contracted and extended conditions.

The actuator may be driven by a fluid; for example, the actuator may comprise a hydraulic, pneumatic or oleo pneumatic actuator. The actuator may include:
 a first hydraulic chamber;
 a second hydraulic chamber;
 a fluid flow path providing fluid communication between the first hydraulic chamber and the second hydraulic chamber,
 wherein the damping device comprises a fluid flow restriction device arranged to modify the damping co-efficient of the actuator by varying the fluid diameter of the fluid flow path.

The fluid flow restriction device may comprise an elongate bar or pin arranged to move axially within an aperture or orifice of fixed size, the bar including a region of reduced cross-section. In some embodiments, the cross section of the bar or pin may vary along a portion or portions of its length, such that the damping coefficient of the actuator may gradually vary with extension/compression of the shock absorber.

The actuator may include a casing defining an inner volume within which a floating piston is slidably disposed so as to be movable relative to the casing, the floating piston being movably coupled to a piston rod, wherein the floating piston includes the elongate rod and the piston rod includes the aperture, the elongate rod including an engagement formation arranged to engage the piston rod at a predetermined degree of relative separation to inhibit further separation of the floating piston and piston rod.

The actuator may be for an assembly in which the actuator is arranged to bias a first part of the assembly to assume a predetermined position relative to the second part, the assembly being arranged, in use, to force the actuator to assume the first condition.

According to a second aspect of the invention, there is provided an assembly including an actuator according to the first aspect arranged to bias a first part of the assembly to assume a predetermined position relative to the second part, the assembly being arranged, in use, to force the actuator to assume the first condition when in a first state and having a second state in which the actuator moves the first part of the assembly to assume the predetermined position relative to the second part.

Thus, the higher damping coefficient of the actuator when in the second condition may be chosen to result in the assembly exhibiting a damping state that is closer to critical damping than the damping state would be if the actuator continuously exhibited the relatively low damping coefficient of the first condition.

The assembly may be an aircraft landing gear assembly. The first part may be a bogie beam. The second part may be a main fitting or a slider.

BRIEF DESCRIPTION OF THE DRAWINGS

Embodiments of the invention will now be described with reference to the accompanying drawings, in which:

FIG. 1 is a schematic diagram of a prior art actuator;

FIGS. 2a to 2d are schematic diagrams of an actuator according to an embodiment of the present invention;

FIGS. 3a to 3d are schematic diagrams of an actuator according to a further embodiment of the present invention;

DETAILED DESCRIPTION

Figure 3A:
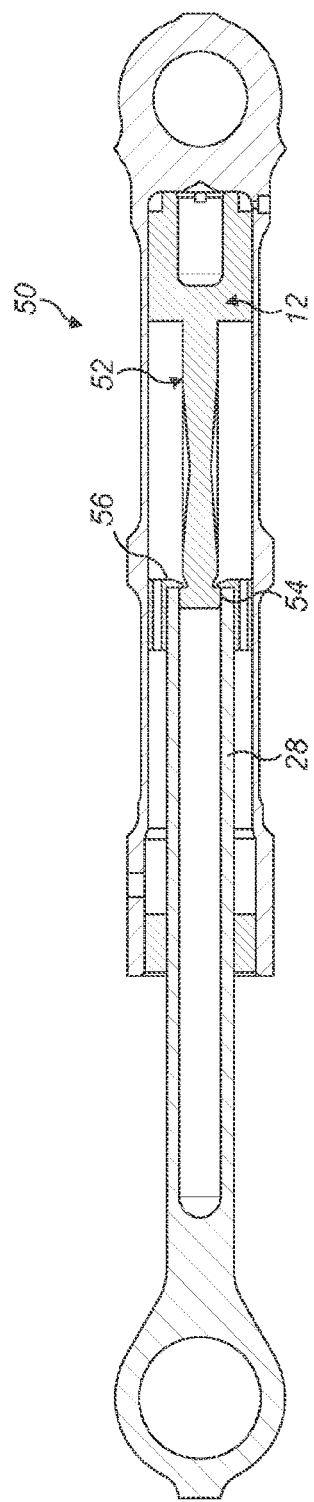

FIG. 1 is a schematic longitudinal cross section view of a known centre seeking actuator 100. The actuator 100 is a "single acting" actuator i.e. when operated it moves to assume the intermediate condition, but is not arranged to be actuated to the compressed or extended conditions.

The actuator 100 includes a casing 102 defining an inner volume that is generally partitioned by a floating piston 112 into a gas chamber 109 and a hydraulic fluid chamber 104. The gas chamber 109 is vented to atmosphere via a gas port 108. The casing 102 defines a first coupling region 110.

The floating piston 112 is slidably housed within the inner volume to move along an axis X. The casing 102 includes a hydraulic fluid port 106 on the opposite side of the floating piston 112 to the gas port 108. The hydraulic fluid port 106 is arranged to be coupled to a hydraulic fluid circuit. A first dynamic gland seal 117 is provided between the floating piston 112 and casing 102 to inhibit hydraulic fluid passing to the gas side 108.

The floating piston 112 defines a floating piston chamber 113 within which a piston 122 of a piston rod 120 is slidably housed to move along the axis X. The piston rod 120 extends from the piston 122 through an aperture in an axial face of the floating piston 112 and through an aperture in an axial face of the casing 102, so as to project from the casing 102. A second dynamic seal 121 is provided between the piston rod 120 and casing 102 within the aperture formed through the axial face of the casing 102, to inhibit hydraulic fluid from passing out of the casing 102 via the aperture. The piston rod 120 defines the a second coupling region 124.

The floating piston 112 includes one or more control apertures 115 arranged to enable fluid communication between the hydraulic fluid chamber 104 and the floating piston chamber 113.

In use, pressurised hydraulic fluid enters the hydraulic fluid port 106 and forces the floating piston 112 to an end stop adjacent to the gas port 108, as well as passing through the control apertures 115 into the floating piston chamber 113 and in doing so forcing the piston rod 120 to extend outwardly with respect to the casing 102. Thus, the actuator 100 is continually biased to an intermediate condition between and distinct from the fully extended condition and the fully compressed condition.

A dominant tensile force applied to the coupling regions 110, 124 results in the floating piston 112 being drawn away from the end stop adjacent the gas port 108 against the spring force provided by the pressurised hydraulic fluid within the casing 102. Thus, the actuator 100 can be forced to move to a fully extended condition. Upon the applied tensile force becoming inferior to the biasing force provided by the hydraulic fluid, the actuator 100 moves towards and assumes the intermediate condition.

A dominant compressive force applied to the coupling regions 110, 124 results in the piston 122 of the piston rod 120 moving towards the piston 114 of the floating piston 112 against the spring force provided by the pressurised hydraulic fluid within the casing 113. Upon the applied compressive force becoming inferior to the biasing force provided by the hydraulic fluid, the actuator 100 moves towards and assumes the intermediate condition.

A centre seeking actuator may form part of an assembly in which the actuator is arranged to bias a first part of the assembly to assume a predetermined position relative to the second part. Such an assembly may, in use, force the actuator to assume a particular condition, which will be referred to as the "first condition", distinct from the intermediate condition. When in the first condition, although the actuator is attempting to move to the intermediate condition, it is desirable for the actuator to not provide further opposition to changes in its extension state due to movement of the assembly. Due to this, a centre seeking actuator suitable for such a purpose will have a low damping coefficient, such as 0.000531 $Ns^2/mm^2$ such that the actuator provides relatively low resistance to changes in its length, which may provide for increased operational lifespan of components of the actuator, such as dynamic seals, components of the hydraulic system such as valves, and/or parts to which the actuator is coupled. An example of such an assembly is an aircraft landing gear in which the centre seeking actuator is a pitch trimmer, coupled between a bogie beam and the main fitting or piston rod thereof.

However, the present inventors have identified that known actuators, and/or parts to which the actuators are coupled, may degrade prematurely due to the low damping coefficient resulting in an under damped assembly.

FIGS. 2a to 2d are schematic longitudinal cross section views of an actuator 10 according to an embodiment of the present invention. The actuator 10 is similar to the known actuator 100 and therefore, for brevity, the following description will focus on the differences between the actuator 10 and the known actuator 100.

The actuator 10 includes a casing 11 defining an inner volume that is generally partitioned by a floating piston 12 into a gas chamber 14 and a hydraulic fluid chamber 16. The gas chamber 14 is vented to atmosphere via a gas port 18. The casing 11 defines a first coupling region 20 by which the actuator 10 maybe mechanically coupled to part of an assembly.

The floating piston 12 is slidably housed within the inner volume to move along an axis X. The casing 11 includes a hydraulic fluid port 22 on the opposite side of the floating piston 12 to the gas port 18. The hydraulic fluid port 22 is arranged to be coupled to a conventional hydraulic fluid circuit (not shown). The hydraulic fluid circuit supplies pressured hydraulic fluid via a piloted check valve to limit the applied fluid pressure and includes a poppet valve or the like to enable hydraulic fluid to exit the actuator into the return line.

The floating piston 12 includes a piston head 41 which may be acted upon by the hydraulic fluid to force the floating piston 12 to move towards the gas port 18.

The floating piston 12 defines a floating piston chamber 24 within which a piston head 26 of a piston rod 28 is slidably housed to move along the axis X. The piston rod 28 extends from the piston 26 through an aperture in an axial face of the floating piston 12 and through a gland defining an aperture in an axial face of the casing 11, so as to project from the casing 11. The floating piston 12 includes a cylindrical collar 43 which terminates in an engagement formation arranged to engage an outer surface of the piston rod 28 at a predetermined degree of relative separation to inhibit further separation of the floating piston 12 and piston rod 28. The piston rod 28 defines a second coupling region 30 by which the actuator 10 may be mechanically coupled to part of an assembly.

The floating piston 12 includes control apertures arranged to enable fluid communication between the hydraulic fluid chamber 16 and the floating piston chamber 24.

In use, pressurised hydraulic fluid enters the actuator 10 via the hydraulic fluid port 22 and forces the actuator 10 to move to the intermediate condition shown in FIG. 2a. A dominant compressive force may move the actuator 10 to a compressed condition as shown in FIG. 2b. A dominant tensile force may move the actuator to an extended condition as shown in FIG. 2c.

The actuator 10 is arranged to form part of an assembly (not shown) in which the actuator biases a first part of the assembly to assume a predetermined position relative to the second part. The assembly has an operating condition in which a dominant force moves the actuator to a first condition, which in this embodiment is between the compressed condition and intermediate condition. In other embodiments the first condition may be anywhere between the intermediate condition on the one hand and the extended or compressed condition on the other hand.

It may be desirable that the actuator 10 has a relatively low damping coefficient when in the first condition, as illustrated in FIG. 2d. The actuator according to embodiments of the invention therefore includes a damping device arranged to provide a relatively low damping coefficient when the actuator 10 is in the first condition, and a relatively high damping coefficient when the actuator is in a second condition, the second condition being equal or adjacent to the intermediate condition. Thus, in moving to assume the intermediate condition to which it is biased, the actuator assumes the second condition in which the damping device provides a relatively high damping coefficient. As such, the higher damping coefficient can be chosen to result in the assembly exhibiting a damping state that is closer to critical damping than the damping state would be if the actuator 10 continuously exhibited the relatively low damping coefficient.

In the illustrated embodiment, the damping device comprises an elongate metering pin 40 which extends from the piston of the floating piston 12 through a damping aperture in the piston 26 of the piston rod 28. The damping aperture is of a fixed size. The space between the metering pin 40 and damping aperture therefore defines a fluid flow path that determines the amount of damping provided as the piston rod 28 moves relative to the sliding piston 12. The metering pin 40 has generally cylindrical sections 42, which when disposed within the damping aperture results in the fluid flow path being relatively small, thereby providing a relatively high damping coefficient. The metering pin 40 also has an inwardly tapered section of reduced width 44, which when disposed within the damping aperture results in the fluid flow path being relative large, thereby providing a relatively low damping coefficient. The profile of the section of reduced width 44 determines the rate of change and amount of damping provided. Thus, the metering pin 40 and damping aperture define a fluid flow restriction device arranged to modify the damping coefficient of the actuator 10 by varying the fluid diameter of the fluid flow path. In other embodiments the metering pin 40 may have any suitable profile which provide a relatively low damping coefficient when the actuator 10 is in the first condition, and a relatively high damping coefficient when the actuator is in the second condition.

FIGS. 3a to 3d are schematic longitudinal cross section views of an actuator 50 according to a further embodiment of the present invention. The actuator 50 is similar to the actuator 10 of the embodiment of FIGS. 2a to 2d.

Figure 3B:
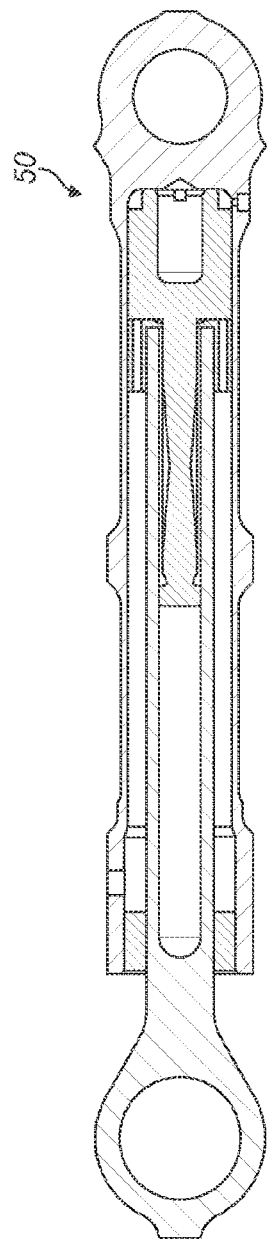

In use, pressurised hydraulic fluid forces the actuator 50 to move to the intermediate condition shown in FIG. 3a. A dominant compressive force may move the actuator 50 to a compressed condition as shown in FIG. 3b. A dominant tensile force may move the actuator to an extended condition as shown in FIG. 3c. The first condition is illustrated in FIG. 3d.

The actuator 50 of FIGS. 3a to 3d differs to embodiment of FIGS. 2a to 2d in that the elongate metering pin 52 includes an engagement formation 54 arranged to engage the piston rod head 56 at a predetermined degree of relative separation to inhibit further separation of the floating piston 12 and piston rod 28. Thus, the engagement formation 54 replaces the collar 43 of the embodiment of FIGS. 2a to 2d, which is advantageous due to the engagement formation 54 being a smaller, lighter component than the collar 43, and provides a simpler arrangement with less attachment points.

Figure 4:
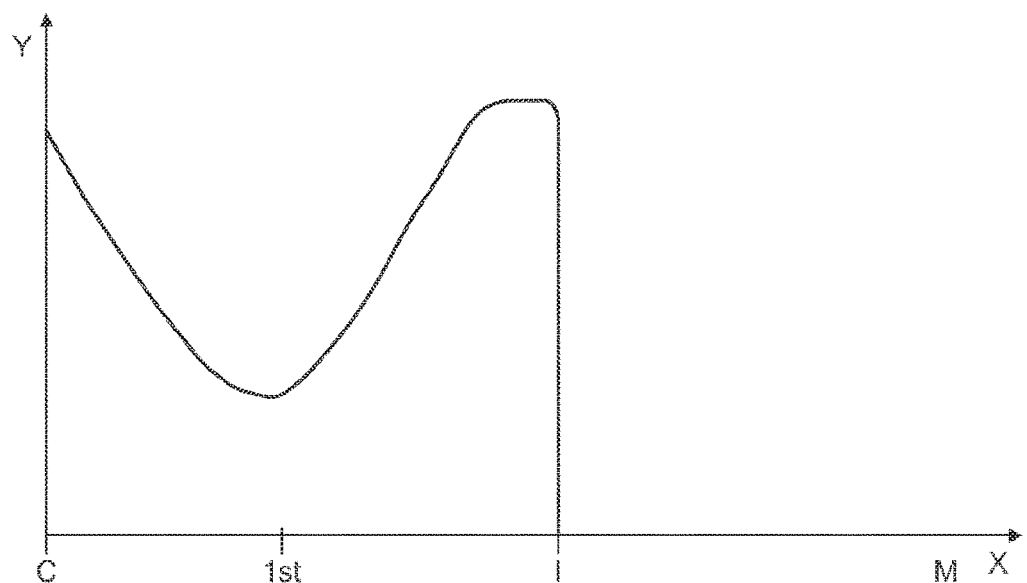
FIG. 4 is a diagram illustrating damping coefficient vs. extension condition for the actuators of FIGS. 2a to 3d.

FIG. 4 is a diagram showing how the damping coefficient (Y axis) varies in accordance with the extension state (X axis) of the actuators illustrated in FIGS. 2a to 3d. As can be seen, the damping coefficient is relatively high when the actuator is fully compressed (C) due to the part of the metering pin closest to the piston head having a relatively wide diameter. However, this need not be the case. As the actuator moved towards the first condition ($1^{st}$) the damping coefficient lowers due to the inwardly tapered section of the metering pin. As the actuator extends from the first condition ($1^{st}$) towards the intermediate condition (I) the damping coefficient increases due to the outwardly tapered portion of the metering pin. As such, the second condition may be considered to be any point between the first condition and the intermediate condition, including the intermediate condition. Further extension of the actuator beyond the intermediate condition may be considered to be un-damped, due to there being no relative movement between the piston rod and floating piston, although the actuator will in practice provide a small degree of damping, such as 0.000531 $Ns^2/mm^2$, due to hydraulic fluid moving through the control apertures as the floating piston moves relative to the casing.

The increase in damping between the first condition and the intermediate condition may assist in the assembly within which the actuator is incorporated exhibiting a damping state that is closer to critical damping than the damping state would be if the actuator continuously exhibited the relatively low damping coefficient. In some cases, oscillation about the intermediate position may move the actuator back towards, but not up to, the first condition, thereby further damping the oscillation.

In some embodiments the damping device may be arranged to damp movement between the floating piston and casing, such as by mounting a metering pin on the main fitting to extend through the control apertures in the piston rod head 56.

One advantage of an actuator according to embodiments of the invention is that it may vary its damping coefficient independent of the biasing force urging it to move to the intermediate condition. Thus, in some embodiments the actuator can assume a low damping state while being biased by, say, control fluid.

Although the actuators of the illustrated embodiments are linear hydraulic actuators, in other embodiments the actuator may comprise any suitable centre seeking actuator which can oscillate about the intermediate condition and includes a variable damping device arranged to increase the damping coefficient at or adjacent to the intermediate condition; for example, the actuator may comprise a pneumatic or spring biased actuator, and in some embodiments the actuator may be a non-linear actuator such as a rotary actuator.

In embodiments of the invention the damping coefficients can be any suitable values; for example, when in the first condition the minimum damping coefficient may be 0.1442 $Ns^2/mm^2$ and when in the second condition the maximum damping coefficient may be 0.408 $Ns^2/mm^2$. As will be appreciated from the forgoing, the damping coefficient may be varied between the minimum and maximum values in accordance with the configuration of the damping device; for example, in accordance with fluid diameter variation along the metering pin.

FIGS. 5*a* to 5*d* show a landing gear assembly 60 according to an embodiment of the present invention. The landing gear 60 includes a main strut 62, having an upper portion (not shown) arranged to be coupled to the underside of an aircraft (not shown) and a lower portion 62*b* telescopically mounted with respect to the upper portion. A bogie beam 64 is pivotally coupled to the lower portion of the main strut 62*b*, the bogie beam 64 having axles 66 mounted on it for carrying one or more wheel assemblies (not shown). A landing gear assembly according to embodiments of the present invention may have any suitable number of axles and wheels per axle.

A linkage 70 is pivotally coupled to the bogie beam 64 at a first coupling region 72*a* and pivotally coupled to the lower strut portion 62*b* at a second coupling region 72*b*. In the illustrated embodiment the linkage is defined by an actuator 80 according to an embodiment of the present invention. As will be appreciated, pivotal movement of the bogie beam 64 relative to the strut 62 results in a change in the condition i.e. the effective length of the actuator 80. The term "effective length" may refer to the distance between the pivot axis of first and second coupling regions 72*a*, 72*b*. Equally, a change in the effective length of the actuator 80 results in pivotal movement of the bogie beam 64 relative to the strut 62 and the actuator 80 can thus be used to "trim" the position of the bogie beam 64 for stowing. In alternative embodiments the coupling regions 72*a*, 72*b* could be reversed and may in other embodiments be coupled between any part of the bogie on the one hand and any part of the strut 62 on the other hand. In some embodiments the linkage 80 may include a multi bar linkage that is movable by an actuator so as to change the angular position of the bogie relative to the strut.

Figure 5A:
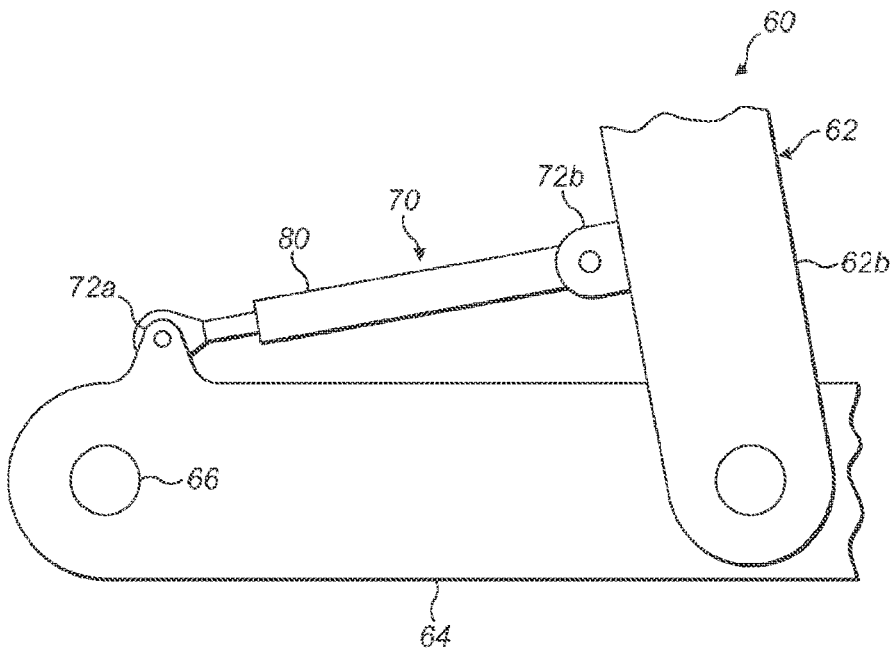
FIGS. 5a to 5d are schematic diagrams of an aircraft landing gear assembly according to an embodiment of the present invention.

When the aircraft is on the ground, as shown in FIG. 5*a*, the landing gear assembly forces the centre seeking actuator to assume the first condition. In this condition, the centre seeking actuator provides a relatively small degree of opposition to forced compression and expansion thereof. In the illustrated embodiment, the first condition is relatively compressed with respect to the intermediate condition.

Figure 5B:
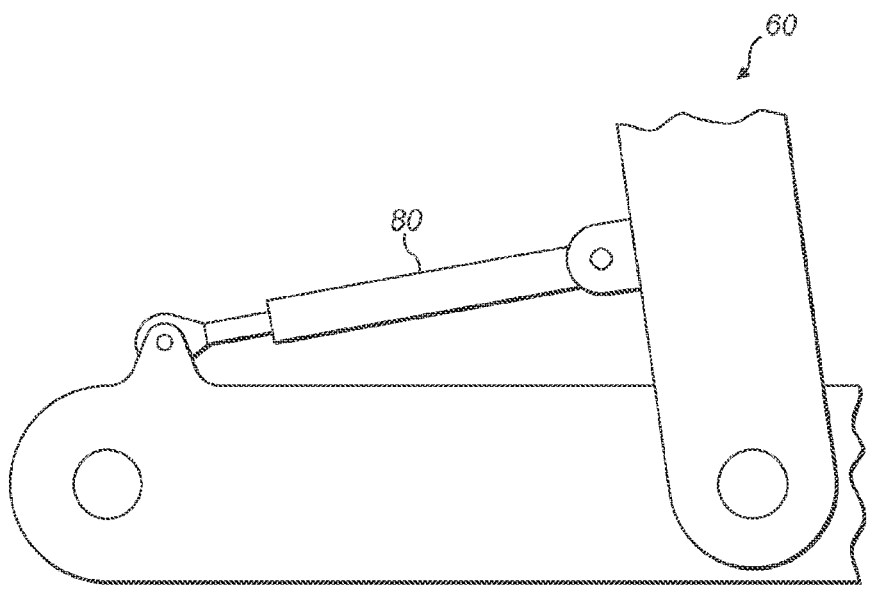

Following weight off wheels, the centre seeking actuator 80 moves the bogie beam 64 towards the intermediate condition for stowing and in doing so the actuator 80 assumes the second condition, as shown in FIG. 5*b*, in which the damping coefficient is increased. The second condition exists within a window of extension between the first condition and the intermediate condition.

Figure 5C:
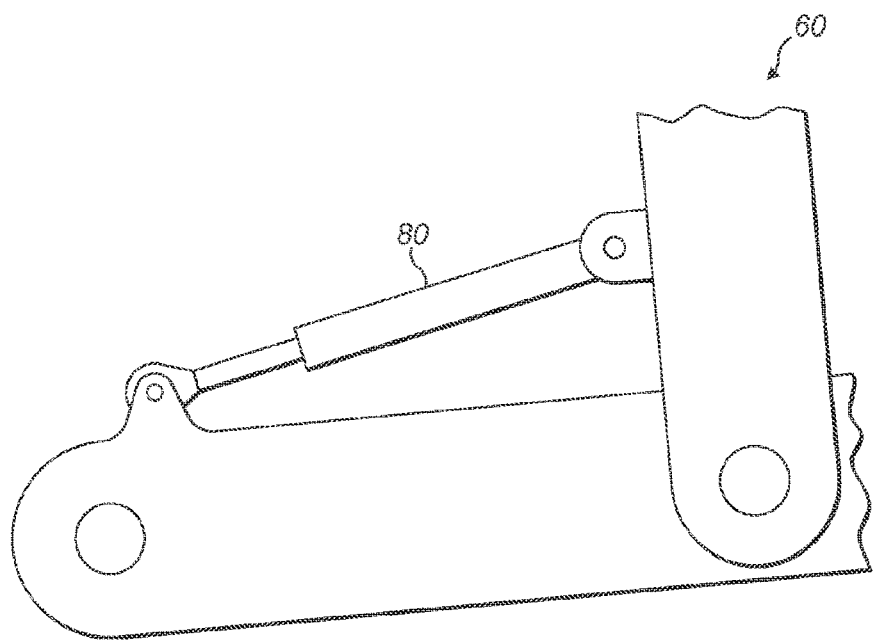
Figure 5D:
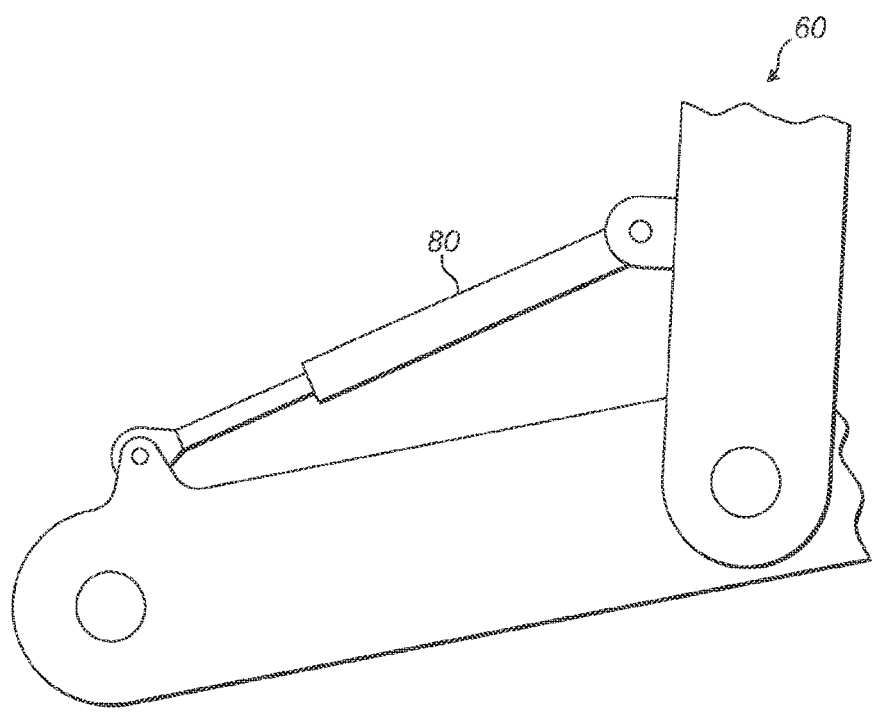

The actuator 80 subsequently assumes the intermediate condition, as shown in FIG. 5*c*. The moment of inertia due to the mass of the bogie beam 64 may cause the actuator 80 to overshoot the intermediate condition, as illustrated in FIG. 5*d*. Once the actuator 80 overcomes the moment of inertia, the actuator 80 retracts towards the intermediate condition and it may again overshoot the intermediate condition to move back into the second condition extension window. This oscillation about the intermediate condition may occur a plurality of times, but due to the increased damping coefficient in the second condition, the actuator according to embodiments of the invention may generally result in an assembly assuming a stable state with fewer oscillations than prior art assemblies.

An assembly according to embodiments of the present invention may be any assembly including a central seeking actuator according to an embodiment of the invention arranged bias a first part of the assembly to assume a predetermined position relative to the second part, the assembly being arranged, in use, to force the actuator to assume the first condition when in a first state and having a second state in which the actuator moves the first part of the assembly to assume the predetermined position relative to the second part; for example, a flaps or slats in an aircraft wing, an oil rig boom, a vehicle suspension system.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A centre seeking actuator arranged to be movable between an extended condition and a compressed condition and being biased to an intermediate condition between and distinct from the extended condition and the compressed condition, the centre seeking actuator comprising:
   A casing defining an inner volume having a first end and a second end;
   A floating piston slidably disposed in the inner volume of the casing so as to be movable relative to the casing;
   a piston rod slidably disposed within the floating piston;
   a pressurised fluid within the inner volume, the pressurized fluid acting on respective surfaces of the floating piston and the piston rod to generate a force to move the floating piston towards the first end and move the piston rod towards the second end to cause the centre seeking actuator to assume the intermediate condition; and
   a damping device arranged to define the damping coefficient of the actuator, the damping device being arranged to provide a relatively low damping coefficient when the actuator is in a first condition distinct from the intermediate condition, and a relatively high damping coefficient when the actuator is in a second condition, the second condition being distinct from the first condition and being equal or adjacent to the intermediate condition wherein the damping device comprises a space between the piston rod and the floating piston.

2. The centre seeking actuator according to claim 1, wherein the second condition is closer to the intermediate condition than to the extended condition or the compressed condition.

3. The centre seeking actuator according to claim 1, wherein the damping device is arranged to increase and/or decrease the damping coefficient by a factor of at least a factor of two between the first condition and the second condition.

4. The centre seeking actuator according to claim 1, wherein the damping device is arranged to provide a plurality of second conditions each with a relatively high damping coefficient.

5. The centre seeking actuator according to claim 1, wherein the damping device is arranged to vary the damping coefficient in accordance with the extension state of the actuator.

6. The centre seeking actuator according to claim 1, wherein the damping device is a passive device.

7. The centre seeking actuator according to claim 1, wherein the actuator is biased towards the intermediate condition from both the contracted and extended conditions.

8. The centre seeking actuator according to claim 1, wherein the actuator is arranged to be driven by a fluid.

9. The centre seeking actuator according to claim 1 including:
a first hydraulic chamber;
a second hydraulic chamber; and
a fluid flow path providing fluid communication between the first hydraulic chamber and the second hydraulic chamber,
wherein the damping device comprises a fluid flow restriction device arranged to modify the damping co-efficient of the actuator by varying the fluid diameter of the fluid flow path.

10. The centre seeking actuator according to claim 9, wherein the fluid flow restriction device comprises an elongate bar arranged to move axially within an aperture or orifice of fixed size, the bar including a region of reduced cross-section midway along the bar.

11. The centre seeking actuator according to claim 10, wherein the cross section of the bar or pin varies along a portion or portions of its length.

12. The centre seeking actuator according to claim 1, wherein:
the floating piston comprises an elongate pin;
the piston rod has a piston rod aperture surrounding the elongate pin; and
the elongate pin includes an engagement formation arranged to engage the piston rod at a predetermined degree of relative separation to inhibit further separation of the floating piston and the piston rod.

13. The centre seeking actuator according to claim 12, wherein the elongate pin comprises a metering pin having a cross-sectional profile that varies along the length of the metering pin.

14. The centre seeking actuator of according to claim 13, wherein the metering pin has a first cross-sectional area at a first location at which the piston rod aperture is positioned when the actuator is in the intermediate condition, and a second cross-sectional area at a second location at which the piston rod aperture is positioned when the actuator is in the first condition.

15. An assembly including a centre seeking actuator according to claim 1 arranged to bias a first part of the assembly to assume a predetermined position relative to a second part of the assembly, the assembly being arranged, in use, to force the actuator to assume the first condition when in a first state and having a second state in which the actuator moves the first part of the assembly to assume the predetermined position relative to the second part of the assembly.

16. The assembly according to claim 15, wherein the assembly comprises an aircraft landing gear assembly.

17. The assembly according to claim 16, wherein the first part of the assembly comprises a bogie beam and the second part of the assembly comprises another component of the landing gear assembly.

18. The centre seeking actuator according to claim 1, wherein the centre seeking actuator is configured such that internal fluid pressure can overcome an applied external compression force to return to the intermediate position from the compressed condition and can overcome an applied extension force to return to the intermediate position from the extended condition.

19. The centre seeking actuator according to claim 1, wherein internal fluid pressure can overcome external compression or extension forces to force the centre seeking actuator to move to the intermediate condition and remain in the intermediate condition.

20. The centre seeking actuator according to claim 1, wherein the centre seeking actuator is biased to the intermediate condition from the extended condition and from the compressed condition.

21. A centre seeking actuator comprising:
a first coupling formation for coupling the centre seeking actuator to a first structure distinct from the centre seeking actuator;
a second coupling formation for coupling the centre seeking actuator to a second structure distinct from the centre seeking actuator;
wherein the centre seeking actuator is configured to be movable between an extended condition in which the first and second coupling formations are relatively far from one another and a compressed condition in which the first and second coupling formations are relatively close to one another, the centre seeking actuator being biased by internal fluid pressure to an intermediate condition between and distinct from the extended condition and the compressed condition, the internal fluid pressure being sufficient to overcome an external compression force applied between the first and second couplings to return the centre seeking actuator to the intermediate condition from the compressed condition and the internal fluid pressure being sufficient to overcome an external extension force applied between the first and second couplings to return the centre seeking actuator to the intermediate condition from the extended condition; and
the centre seeking actuator further comprising a damping device arranged to define a damping coefficient of the actuator, the damping device being configured to provide a relatively low damping coefficient when the actuator is in a first condition distinct from the intermediate condition, and a relatively high damping coefficient when the actuator is in a second condition, the second condition being distinct from the first condition and being equal or adjacent to the intermediate condition the centre seeking actuator further comprising: a casing defining an inner volume; a floating piston slidably disposed in the inner volume of the casing so as to be movable relative to the casing; a piston rod slidably disposed within the floating piston; wherein the damping device comprises a space between the piston rod and the floating piston.

* * * * *